United States Patent
Thomas et al.

(10) Patent No.: US 12,089,660 B2
(45) Date of Patent: *Sep. 17, 2024

(54) WEARABLE FOOT COVER FOR FALL PREVENTION

(71) Applicant: Treds, LLC, Burkburnett, TX (US)

(72) Inventors: Jayne Thomas, Burkburnett, TX (US); Brian D. Bradley, Kingston, OK (US)

(73) Assignee: TREDS, LLC, Burkburnett, TX (US)

( * ) Notice: Subject to any disclaimer, the term of this patent is extended or adjusted under 35 U.S.C. 154(b) by 214 days.

This patent is subject to a terminal disclaimer.

(21) Appl. No.: 17/147,216

(22) Filed: Jan. 12, 2021

(65) Prior Publication Data

US 2021/0127760 A1    May 6, 2021

Related U.S. Application Data

(63) Continuation of application No. 16/172,073, filed on Oct. 26, 2018, now Pat. No. 10,932,500.

(Continued)

(51) Int. Cl.
| | |
|---|---|
| *A43B 13/16* | (2006.01) |
| *A41B 11/00* | (2006.01) |
| *A41B 11/02* | (2006.01) |
| *A43B 1/04* | (2022.01) |
| *A43B 3/16* | (2022.01) |
| *A43B 23/02* | (2006.01) |
| *B33Y 80/00* | (2015.01) |

(52) U.S. Cl.
CPC ............ *A41B 11/008* (2013.01); *A41B 11/02* (2013.01); *A43B 1/04* (2013.01); *A43B 3/16* (2013.01); *A43B 3/163* (2013.01); *A43B 23/0225* (2013.01); *A43B 23/0255* (2013.01); *B33Y 80/00* (2014.12); *A41B 2400/20* (2013.01); *A41B 2400/80* (2013.01); *A41B 2500/20* (2013.01); *A41B 2500/50* (2013.01)

(58) Field of Classification Search
None
See application file for complete search history.

(56) References Cited

U.S. PATENT DOCUMENTS

| | | | | |
|---|---|---|---|---|
| 3,381,174 A | * | 4/1968 | Ceraldi | ................. A43B 3/163 |
| | | | | 36/1 |
| 3,760,056 A | * | 9/1973 | Rudy | ................. B29C 61/0608 |
| | | | | 264/234 |

(Continued)

FOREIGN PATENT DOCUMENTS

| | | |
|---|---|---|
| GB | 2530039 A | 3/2016 |
| WO | 2016022298 A1 | 2/2016 |

*Primary Examiner* — Jila M Mohandesi
(74) *Attorney, Agent, or Firm* — Goodhue, Coleman & Owens, P.C.

(57) ABSTRACT

A foot cover including a stretchable lattice configured to be worn over a foot of a user. The stretchable lattice being fitted to a shape of a human foot. The stretchable lattice is an elastomer. The stretchable lattice defines a first plurality of openings and a second plurality of openings. The foot cover includes a first end of the stretchable lattice enclosing toes of the foot of the user. The foot cover includes a second end of the stretchable lattice defining an opening for receiving the foot of the user, wherein first end includes the first plurality of openings that are smaller than the second plurality of openings associated with a body of the stretchable lattice.

20 Claims, 7 Drawing Sheets

Related U.S. Application Data

(60) Provisional application No. 62/577,438, filed on Oct. 26, 2017.

(56) References Cited

U.S. PATENT DOCUMENTS

| | | | |
|---|---|---|---|
| 4,149,274 A * | 4/1979 | Garrou | A41B 11/008 66/185 |
| D278,947 S | 5/1985 | Foldes | |
| 4,608,769 A * | 9/1986 | Sturlaugson | A43B 11/00 36/51 |
| 4,616,428 A * | 10/1986 | Leger | A43B 3/163 36/7.1 R |
| 4,665,301 A * | 5/1987 | Bondy | H05B 3/36 219/549 |
| 4,665,308 A * | 5/1987 | Courvoisier | H05B 3/34 36/2.6 |
| 4,847,934 A | 7/1989 | Weber | |
| 4,907,350 A | 3/1990 | Chilewich et al. | |
| 4,918,839 A * | 4/1990 | Brandon | A43B 3/163 36/97 |
| 4,941,271 A * | 7/1990 | Lakic | A43B 7/082 36/2.6 |
| 6,595,244 B1 * | 7/2003 | Sollars, Jr. | D03D 11/02 428/36.1 |
| 6,662,389 B1 * | 12/2003 | Carroll | A43B 5/0407 5/413 AM |
| 6,665,883 B2 * | 12/2003 | Sloan | A43B 3/106 2/239 |
| 6,684,411 B1 | 2/2004 | Bachert et al. | |
| 7,012,525 B1 | 3/2006 | Ghioto | |
| 7,107,626 B1 | 9/2006 | Andrews | |
| 7,140,129 B2 * | 11/2006 | Newson | A43B 3/244 36/3 R |
| 7,207,961 B1 | 4/2007 | Benton et al. | |
| D615,284 S | 5/2010 | McDonald | |
| 8,296,969 B2 | 10/2012 | Granger et al. | |
| 8,393,028 B2 | 3/2013 | Namkook et al. | |
| 8,919,620 B2 | 12/2014 | Taylor et al. | |
| 9,049,889 B2 | 6/2015 | Grubisha | |
| 9,603,419 B2 | 3/2017 | Crosby et al. | |
| 9,603,748 B2 | 3/2017 | Valois et al. | |
| 2005/0022420 A1 | 2/2005 | Thomas | |
| 2005/0120463 A1 | 6/2005 | Cacioppo | |
| 2005/0188562 A1 | 9/2005 | Clarke et al. | |
| 2006/0201025 A1 * | 9/2006 | Chou | A43B 3/35 36/2.6 |
| 2007/0033711 A1 | 2/2007 | Achtelstetter | |
| 2007/0271680 A1 | 11/2007 | Howell et al. | |
| 2008/0250666 A1 | 10/2008 | Votolato | |
| 2009/0172867 A1 * | 7/2009 | Kopp | A61F 13/043 604/293 |
| 2009/0218377 A1 | 9/2009 | Hood | |
| 2009/0241369 A1 | 10/2009 | Votolato | |
| 2010/0269271 A1 | 10/2010 | Kim et al. | |
| 2011/0271553 A1 | 11/2011 | McCarron | |
| 2012/0167416 A1 | 7/2012 | Christensen et al. | |
| 2013/0000148 A1 * | 1/2013 | Gellis | A41B 11/008 36/87 |
| 2014/0202045 A1 | 7/2014 | Glassman | |
| 2015/0201697 A1 | 7/2015 | Chen | |
| 2016/0015116 A1 * | 1/2016 | Jones | A43B 3/106 36/84 |
| 2016/0037860 A1 | 2/2016 | Holt | |
| 2016/0150830 A1 | 6/2016 | Serrano-Wu | |
| 2016/0192741 A1 | 7/2016 | Mark | |
| 2016/0353808 A1 * | 12/2016 | Rafto | A41B 11/00 |
| 2018/0035723 A1 * | 2/2018 | Utecht | A41B 11/007 |
| 2018/0255867 A1 | 9/2018 | Cornett | |
| 2019/0083290 A1 | 3/2019 | Jones et al. | |
| 2021/0274857 A1 * | 9/2021 | Kim | A41B 11/008 |

* cited by examiner

WEARABLE FOOT COVER FOR FALL PREVENTION

PRIORITY STATEMENT

This application claims priority to U.S. Provisional Patent Application No. 62/577,438, filed on Oct. 26, 2017, titled Foot Cover for Fall Protection and is a continuation of U.S. Utility patent application Ser. No. 16/172,073 filed on Oct. 26, 2018 each of which is hereby incorporated by reference in their entireties.

BACKGROUND

I. Field of the Disclosure

The illustrative embodiments relate to foot covers. More specifically, but not exclusively, the illustrative embodiments relate to stretchable non-slip or slip-free foot covers for reduction or prevention of patient or user falls.

II. Description of the Art

Patient falls are a significant concern for hospitals and other care facilities. According to the Centers for Disease Control there are between seven hundred thousand to one million falls in acute care facilities annually. One in five of those falls causes serious injury to the patient resulting in over thirty-one billion in medical costs, damages, and settlements. The average cost for each fall is a staggering thirty thousand dollars and increases with age.

Tactics to reduce risk for falls cover both cultural (behavioral) and structural (engineering) controls. Significant work and focus has been devoted to improve awareness and behaviors known to reduce falls, such as hourly rounding, positioning of equipment, pharmaceutical regimens, and general safety instruction. Cultural changes are not effective for fall prevention due to staff unwillingness to accept tactics that require extra work with no perceived value.

SUMMARY OF THE DISCLOSURE

The illustrative embodiments provide a foot cover including a stretchable lattice configured to be worn over a foot of a user. The stretchable lattice being fitted to a shape of a human foot. The stretchable lattice is an elastomer. The stretchable lattice defines a first plurality of openings and a second plurality of openings. The foot cover includes a first end of the stretchable lattice enclosing toes of the foot of the user. The foot cover includes a second end of the stretchable lattice defining an opening for receiving the foot of the user, wherein first end includes the first plurality of openings that are smaller than the second plurality of openings associated with a body of the stretchable lattice.

Another embodiment provides a foot cover. The foot cover includes a stretchable lattice configured to be worn over a foot of a user. The stretchable lattice being fitted to a shape of a human foot. The stretchable lattice defines a first number of openings and a second number of openings. The foot cover further includes a first end of the stretchable lattice enclosing toes of the foot of the user. The foot cover further includes a second open end of the stretchable lattice for receiving the foot of the user. The first end includes the first number of openings that are smaller than the second number of openings associated with a body of the stretchable lattice.

Yet another embodiment provides a foot cover. The foot cover includes a stretchable lattice configured to be worn over a foot of a user. The stretchable lattice being fitted to a shape of a human foot. The stretchable lattice is an elastomer. The stretchable lattice defines a number of openings enabling visualization and ventilation of the foot. The foot cover further includes a first end of the stretchable lattice enclosing toes of the foot of the user. The foot cover further includes a second open end of the stretchable lattice for receiving the foot of the user, wherein the second open end is flared.

Another embodiment provides a system, method, and foot cover for preventing slippage. The foot cover includes a stretchable lattice configured to be worn over a foot of a user. The stretchable lattice defines a plurality of openings providing ventilation to the foot of the user. A first end of the stretchable lattice encloses toes of the foot of the user. An opening of the stretchable lattice defines an opening for receiving the foot of the user.

Another embodiment provides a method for utilizing a foot cover to prevent slippage. A foot cover to be worn by a user is retrieved. The foot cover includes a stretchable lattice for fitting a foot of the user. The stretchable lattice defines multiple openings for providing ventilation to the foot of the user. The foot cover is positioned on the foot of the user. A fit of the foot cover is secured on the foot of the user.

BRIEF DESCRIPTION OF THE DRAWINGS

Illustrated embodiments are described in detail below with reference to the attached drawing figures, which are incorporated by reference herein, and where.

DETAILED DESCRIPTION OF THE DISCLOSURE

Figure 1:
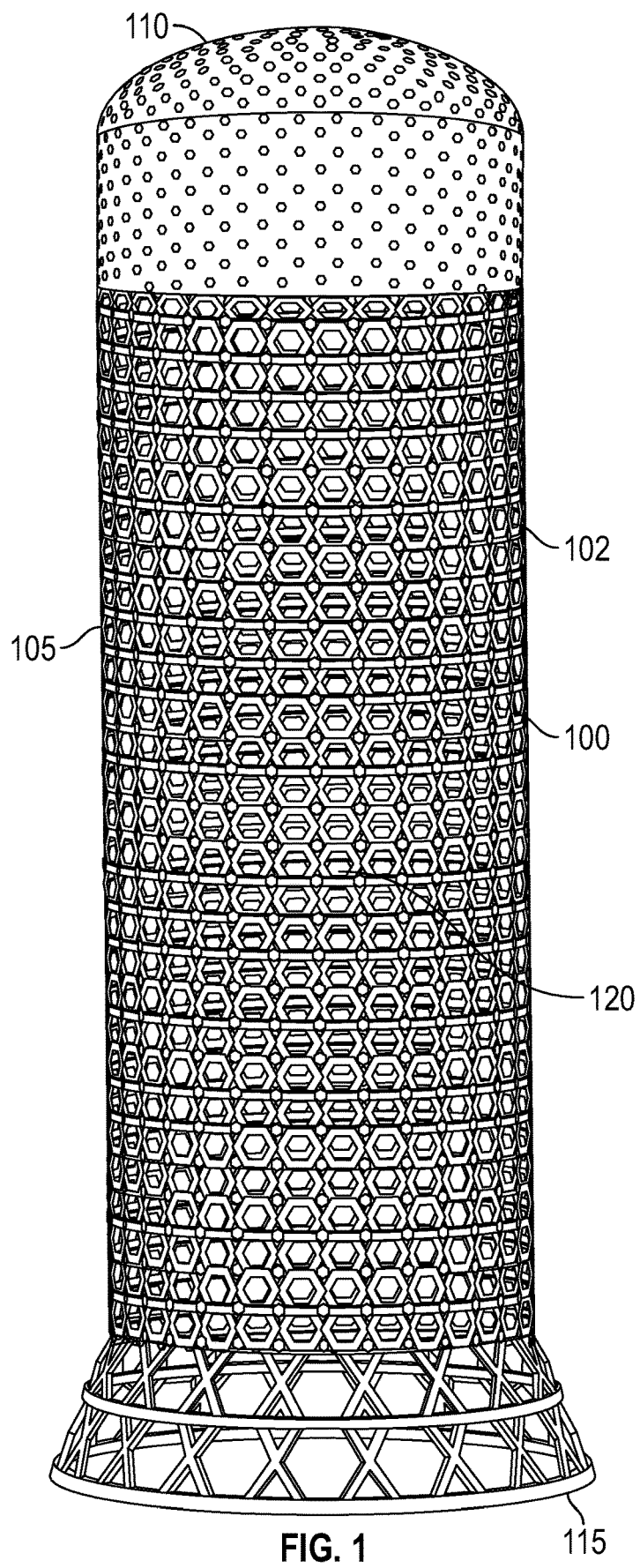
FIG. 1 is a pictorial representation of a foot cover in accordance with an illustrative embodiment.
Figure 2:
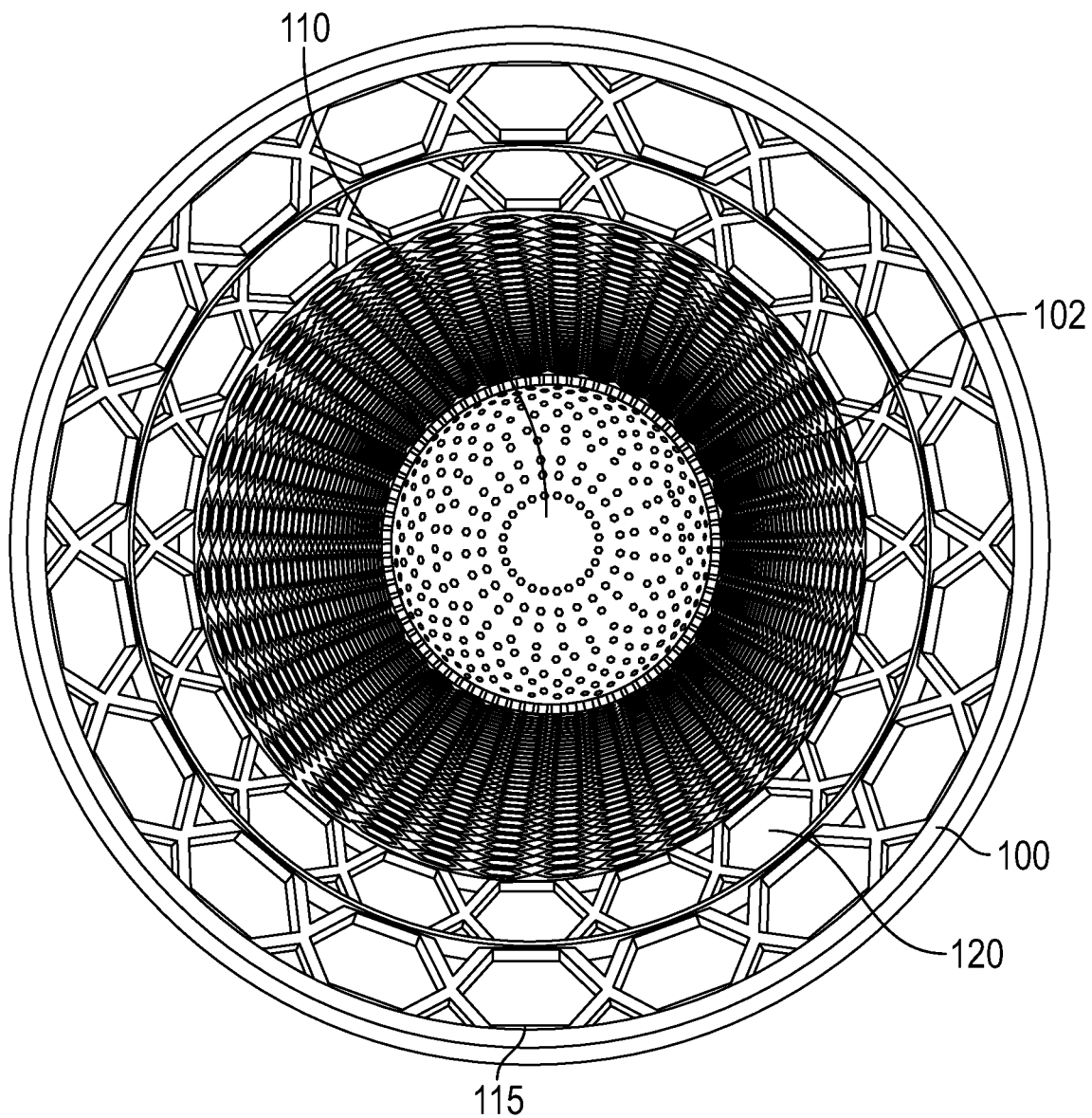
FIG. 2 is a pictorial representation of an opening of a foot cover in accordance with an illustrative embodiment.
Figure 3:
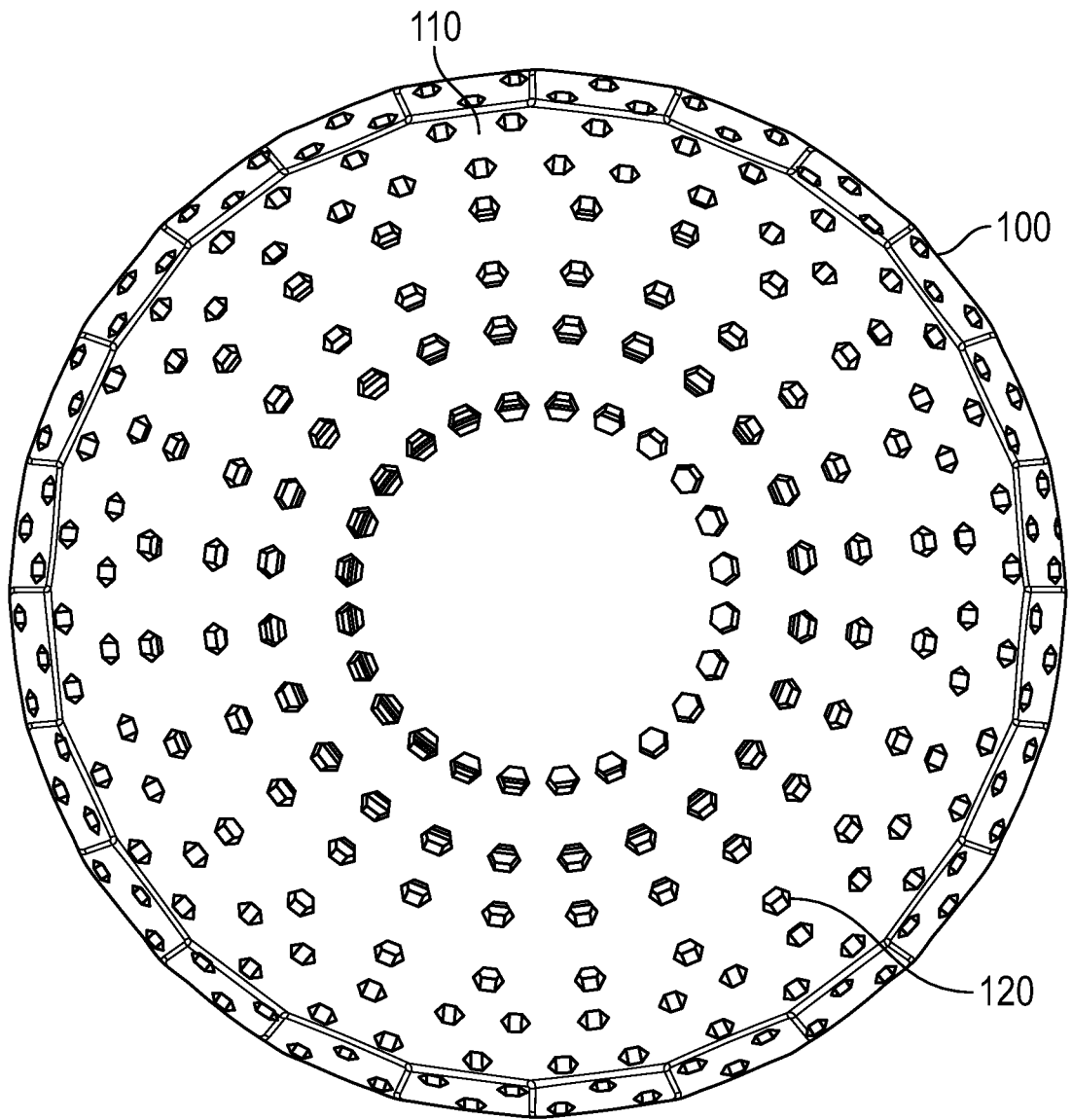
FIG. 3 is a pictorial representation of a toe portion of a foot cover in accordance with an illustrative embodiment.

The illustrative embodiments provide a foot cover for reducing slip risks for patients and users (used interchangeably). The foot cover may be a stretchable slip-free foot cover. The foot cover may be cylindrically shaped or shaped or fitted to a foot, ankle, and/or leg of the user. In one embodiment, the foot cover may be formed of an elastically stretchable polymer, rubber, or blend of similar conformable slip-free compounds. Additional compounds may also be added to increase anti-slip properties, anti-microbial, and antifungal properties of the foot cover. The materials of the foot cover may also be coated, embedded, filled, or infused with such compounds (e.g., powder, liquid, gel, granules/micro-pellets, etc.).

Many types of non-slip footwear utilize weaved or closed structures that may increase the temperature of the user's feet unacceptably causing comfort issues. As a result, a patient may unwittingly remove their non-slip footwear to cool off their feet. In a hospital or other care facility, patients increase the risk of slip and fall events when the patient removes their safety footwear due to an increase in skin temperature or discomfort caused by hospital footwear with limited or zero ventilation. The illustrative embodiments address this issue through a unique vented design. The described embodiments may be conveniently and comfortably utilized by all patients regardless of footwear options thus reducing the potential for slipping across all patient demographics. For example, the foot cover may be worn over a bare foot, sock, slipper, shoe, or other footwear. The foot cover may be stretched and positioned to fit the unique physiology and needs of the patient. The foot cover may utilize a closed configuration (e.g., tube or sock shape), a fastened configuration where one or more sides or ends are fastened or otherwise connected, or wrapped completely or partially around the foot of the user.

The illustrative embodiments, figures, and description may be combined across the figures and specification without limitation and regardless of restriction whether naturally or artificially applied. The different features, functions, structures, as well as applicable alternatives, embodiments, functions, features, and components may be combined.

FIGS. 1-3, and 8 are pictorial representations of a foot cover 100 in accordance with an illustrative embodiment. In one embodiment, the foot cover 100 represents a stretchable lattice 102 representing a pattern, or framework that may be worn on a user's foot. The foot cover 100 may include a body 105, a toe portion 110, and an open end 115. The foot cover 100 may define many openings 120.

The illustrative embodiments of the foot cover 100 are a significant improvement over ill-fitting non-skid socks. For example, if a non-skid sock is too loose it may slip or rotate on the foot causing the protective footwear to be improperly positioned to prevent slipping (in some cases it may increase the potential for tripping or falling). Many of the existing surgical socks do not provide complete non-slip coverage on the foot. Many products do not encompass the foot and instead have limited traction areas on the bottom of the sock that do not extend around the sides or top of the sock. The illustrative embodiments utilize stretchable materials designed to a specific SHORE rating that conforms and contours comfortably to multiple feet sizes thereby providing a secure non-skid foot cover 100 for all patients.

The foot cover 100 may be formed of any number of materials with elastomeric and non-slip properties. In one embodiment, the foot cover 100 is formed from a rubber-like material. The material of the foot cover 100 may also represent any number of materials, such as polymers, natural rubber, rubber composites, nitrile rubber, vito/fluoro rubber (FKM), AFLAS TFE elastomer, hydrogenated nitrile (HNBR), ethyl polyacrylate rubber (ACM), ethylene acrylate rubber (VAE, AEM, VAMAC), ethylene propylene rubber (EPM, EPDM), polyurethane rubber, epichlorohydrin, polyethylene Hypalon, polyblend, butyl rubber, silicone rubber, fluoro silicone, compositions, or blends of other slip-free materials. In addition, any number of materials may be added to the lattice 102 to enhance the non-slip, stretch, comfort, and potential medical properties of the foot cover. Additional non-slip materials may be added to all or portions of the lattice 102, such as an outside surface 101, utilizing a spray on, bath, powder application, chemical deposition, or other process. The lattice 102 may provide encompassing (360 degree) coverage of the foot. An inside surface of the lattice 102 may also be coated with a material like layer for the comfort of the user and to enhance breathability.

Many existing products may have limited elasticity that promotes constriction at the ankle and foot. This constriction may cause decreased circulatory flow, edema, and a breakdown in skin integrity. The foot cover 100 addresses this issue with maximum elasticity that promotes flexing and conforming the material of the foot cover 100 to adapt to a varying conditions for the patient's extremities. For example, due to variations in disease processes and symptoms, some patients that use the foot cover 100 may encounter several inches of foot expansion and contraction within a twenty-four-hour period.

In one embodiment, the foot cover may have any number of anti-microbial, anti-bacterial, or antifungal properties. The lattice 102 may be formed from a single layer of material or multiple stacked or nested layers. In one embodiment, the lattice 102 is substantially flattened. That is the width of the strands of the lattice 102 may be substantially wider than their thickness. As a result, the lattice 102 is more comfortable when worn without causing pain points or irritating the user's skin, tissues, or bones. In addition, the flattened material that makes up the lattice 102 provides more surface area for the portion of the lattice 102 that comes in contact with the ground or floor for providing additional traction to prevent slips or falls.

The lattice 102 may represent any number of patterns. In one embodiment, the foot cover 100 may utilize a honeycomb design. The honeycomb lattice 102 may allow for optimal ventilation and visualization of the skin of the user to improve ease of patient assessment while providing non-skid protection. As a result, a patient wearing the foot cover 100 may be monitored and treated in many cases without having to remove the foot cover 100. In one embodiment, the distinctive honey comb pattern may include dense webbing at the toe portion 110. The foot cover 100 may also include relaxed webbing through the body 105 and may slightly flare at the open end 115. The dense webbing of the lattice 102 at the toe portion 110 may protect and secure the toes of the user. The enclosed toe portion 100 may decrease trip hazards when moving between different flooring types, such as slippery to dry surfaces, or transitioning from various surfaces, such as carpet, tile, wood, concrete, rugs, or so forth. The density of the lattice 102 may be varied for different uses and applications. For example, the density of the lattice 102 may vary based on desired compression, slip rating, temperature control, patient age, patient stability, and so forth.

In another embodiment, the lattice 102 may define openings 120 that are honeycomb shaped, circular, square, triangular, polygonal, pentagonal, hexagonal, octagonal, asymmetric, or so forth. The openings 120 may also be referred to as vents. The size of the lattice 102 may vary based on the application. For example, a patient that is at a very high risk of slipping or falling may utilize a foot cover 100 with a tighter weave of lattice 102 and smaller openings 120. Similarly, low risk patients may utilize a foot cover 100 with much larger openings 120. The size of the lattice 102 may also vary based on the circulation and warmth needs of the users. For example, lattices 102 with smaller openings 120 may retain more heat whereas lattices 102 with larger openings 120 may dissipate more heat.

In one embodiment, the body 105 may be substantially straight and cylindrically-shaped. In another embodiment, the body 105 may be curved or sock-shaped for better fitting the user. The size of the foot cover 100 may be varied for children, teenagers, adults, and individuals with specific conditions or issues (e.g. feet/leg curvature, missing toes, burns, etc.). The shape of the foot cover 100 may also vary based on specific needs.

The open end 115 may flare slightly to provide an easy hand hold and for more easily inserting the foot, ankle, and/or portion of the leg into the foot cover 100. The flared design of the open end 115 helps to accommodate the easy insertion and removal of the foot at the heel and the toe.

In one embodiment, the lattice 102 may represent a cloth, fabric, strands/cords/strings, or other similar material that is coated with a non-slip surface. As a result, the foot cover 100 may be more durable and may even be cleaned or sanitized and utilized multiple times (or repeatedly). For example, a flattened bungie like material coated with a slip resistant compound/material, such as synthetic rubber or thermoplastic elastomer, may form the lattice 102.

In one embodiment, the lattice 102 may include one or more wires or conductive elements for heating the foot of the user as an integrated or separate portion of the lattice 102. The lattice 102 may also include integrated tubes for inflating or deflating portions of the foot cover 100 utilizing air, gas, gel, foam, liquid, or any other substance that provides adjustable rigidity to add compression and help conform the foot cover 100 to the foot of the user. In addition, the inflatable tubes may also provide a secondary method of tightening compression on the foot cover 100 without the need for laces or other fasteners. In another embodiment, the tubes (not shown) may be positioned adjacent the lattice 102 without being part of the lattice 102. For example, the inflatable tubes may be positioned on the interior or exterior of the lattice 102 to provide an enhanced fit to the user. In other examples, inflatable bladders, pockets, or reservoirs may be utilized to adjust the fit of the foot cover 100 as inflated by a pump (manual or electric), blow tube, or so forth. The inflatable tubes may also represent a secondary layer that may be integrated with or attached to the lattice 102 as needed.

In another embodiment, the foot cover 100 may be available in an open configuration. For example, the foot cover 100 may represent a wrap that is selected based on size, positioned around the foot, and then secured in place. The lattice 102 configuration may allow the foot cover 100 to be sized for the user because the lattice can be used as a base/anchor for fasteners at numerous points. The foot cover 100 may be secured in place utilizing one or more of Velcro, zippers, hooks and latches, clips (e.g., U-clips) straps, laces, or so forth. In one example, the foot cover 100 may lace along a top portion of the foot and ankle so that a potential seam does not interfere with the evenness, comfort, stability, or effectiveness of the foot cover 100. For example, the foot cover 100 may be shaped so that the size and shape of the user's foot is accommodated when the foot cover 100 is wrapped around the user's foot, ankle, and/or leg. In another embodiment, a portion of the user's foot, such as the toe or ankle, may be encompassed in the foot cover with the remaining portion of the lattice 102 being wrapped around the user's foot.

In one embodiment, the foot cover 100 may be coated with one or more compounds or medications for delivery to the foot, ankle, and leg of the user. For example, the materials of the foot cover 100 may include time-release medications that may be utilized to deliver antibiotics and topical treatments to the user. The foot cover 100 may also include materials that are utilized to apply a heating or cooling effect to enhance circulation, healing, comfort or treatments.

Figure 4:
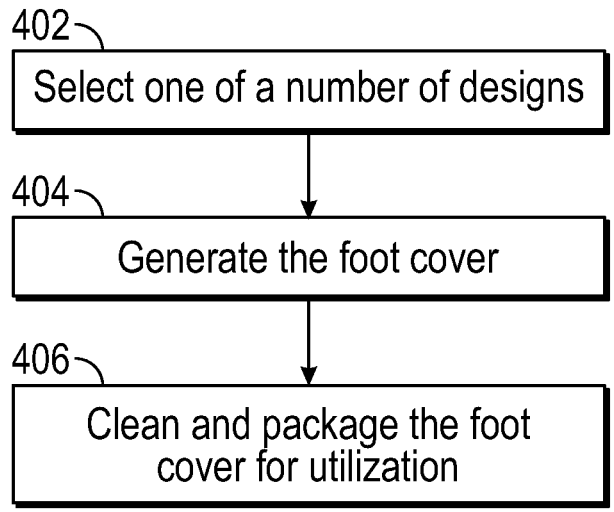
FIG. 4 is a flowchart of a process for manufacturing a foot cover in accordance with an illustrative embodiment.

FIG. 4 is a flowchart of a process for manufacturing a foot cover in accordance with an illustrative embodiment. In one embodiment, the process of FIG. 4 may be implemented by an automated manufacturing system that may include one or more molds, injection systems, conveyers, 3D printers, packaging devices, and so forth. In one embodiment, the process may begin by selecting one of a number of designs (step 402). The sizes and shapes of the foot covers may vary significantly based on users and applications. For example, the sizes may vary for children and adults. Similarly, the foot cover may be selected to include a fitted configuration, a cylindrical configuration, or a wrap. In one embodiment, a mold may be selected based on previously 3-D designs and testing. The foot of a user may be scanned utilizing one or more optical, laser, smart phone/smart devices, or other systems, devices, or applications. The foot of the user may also be analyzed utilizing a mechanical measuring system (e.g., determine foot width, length, height, etc.).

Next, the process generates the foot cover (step 404). In one embodiment, the foot cover may be injection molded utilizing any number of polymers, rubber, or other compounds. In another embodiment, the foot cover may be 3D printed utilizing an accelerated printing process. The foot cover is generated utilizing a material that maintains a proper SHORE rating between 20-6 SHORE to ensure the correct flexibility combined with the proper compound rigidity, strength, and durability. A SHORE rating of between 20 and 60 may allow the foot cover to stretch and conform to the foot naturally while still accommodating a broader range of shoe or feet sizes to eliminate the need to offer a foot cover in every size thereby reducing expenses and enhancing availability to users. The foot cover may be composed of any number of materials based on the slip risk desired for the applicable foot cover.

In one embodiment, the lattice pattern or framework may be enhanced with any number of additional materials (e.g., dipping, spraying, chemical deposition, powder coated, etc.) for added traction, treating the lattice (e.g., antifungal, antibacterial, etc.).

Next, the system cleans and packages the foot cover for utilization (step 406). In some embodiments, the process of FIG. 4 may be performed in a sterile environment utilizing sterile processes, such that the foot cover may be utilized as a medical device or treatment. In addition, any number of sterile or semi-sterile processes may be utilized.

The illustrative embodiments meet or exceed standards and suggestions given by Committee F13 on Pedestrian/Walkway Safety and Footwear that set Slip Resistance Measurement Standards. Applicable testing also complies with ASTM F-13 standards for "wet testing" utilizing the portable inclinable articulated strut tribometer (PIAST, also known as the Brungraber Mark II Test) and the Variable Incidence Tribometer (VIT, also known as the English XL). The applicable tests may measure an items ability to generate friction thereby reducing slippage.

The illustrative embodiments utilize manufacturing and product testing that utilizes benchmarks from either or both above-referenced tests for measuring information, data, and parameters, such as a coefficient of friction (COF). The test results generate slip resistance ratings that range from 0.0 (Low Slip Resistance) to 1.) (Extremely Slip Resistant). While there is currently no such thing as a slip-proof shoe or footwear, the illustrative embodiments utilize a blend of compounds to ensure the highest possible slip resistance rating that enhances traction through friction. Materials that are softer may be utilized for their slip resistance even in the presence of water, oil, or other liquids, or solids. The foot cover may utilize any number of lattice and tred patterns as are outlined including grids, triangles, chevrons, L-shapes, V-shapes, curves, logos, lines, curving lines, channels, ridges, asymmetric patterns, and so forth.

Figure 5:
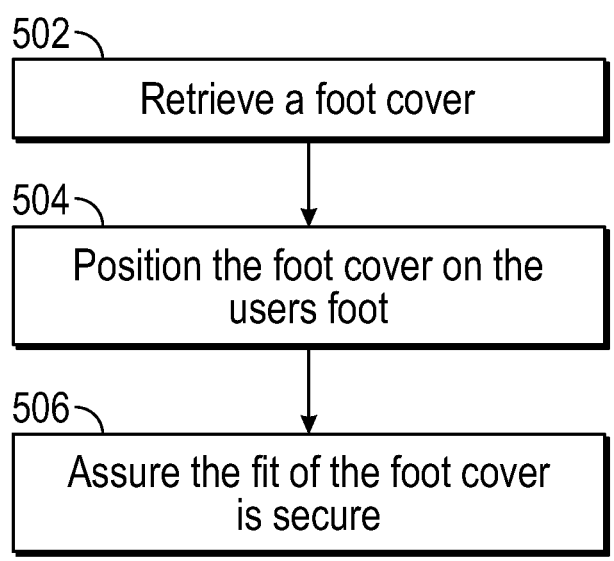
FIG. 5 is a flowchart of a process for positioning a foot cover in accordance with an illustrative embodiment.

FIG. 5 is a flowchart of a process for positioning a foot cover in accordance with an illustrative embodiment. In one embodiment, the process of FIG. 5 may be performed utilizing a foot cover by a caregiver, family member, medical professional, guardian, or the user himself/herself. In one embodiment, the process may begin by retrieving a foot cover (step 502). In one embodiment, the foot cover may be retrieved from an applicable package or storing area. For example, the foot cover may be stored in a sealed plastic bag, shrink wrap, paper cover, sterile covering, or so forth. The foot cover may be selected based on the size, shape, patient condition, slip risk, patient information (e.g., height, weight, age, etc.), or so forth.

In other embodiments, the foot cover may be sterilized for multiple uses until the lattice begins to break down or become ineffective. For example, the foot cover may be sterilized utilizing heat, chemicals, a bath, an infrared applicator, autoclave, soap and water, sprays, or other processes that do not damage or render unusable or ineffective the foot cover.

Next, the user positions the foot cover on the user's foot (step 504). In one embodiment, the user's foot is slid into the foot cover through an opening. All or portions of the user's foot, ankle, and leg may be inserted into the foot cover. In some embodiments, the foot cover may be similar to an invisible foot cover, liner foot cover, an anklet (or ankle length) foot covers, quarter length foot covers, mid-calf foot covers, and even knee length foot covers. The foot cover may also be wrapped around the foot of the user in halves (e.g., clamshell enclosure along the top of the foot). The foot cover may also be shaped like a bandage that is quickly wrapped around the foot of the user (e.g., 2-5-inch-wide segments that may be trimmed to fit). Any number of clips, fasteners, tape, hooks, tabs, straps, laces, or so forth may be utilized to secure the foot cover. For example, the lattice structure of the foot cover may be utilized as anchor points to select the desired fit.

Next, the user assures the fit of the foot cover is secure (step 506). The user may adjust or move the foot cover as needed to best fit the individual wearing the foot cover. As previously noted, different versions of the foot cover may be wrapped around the user in full or in part.

Figure 6:
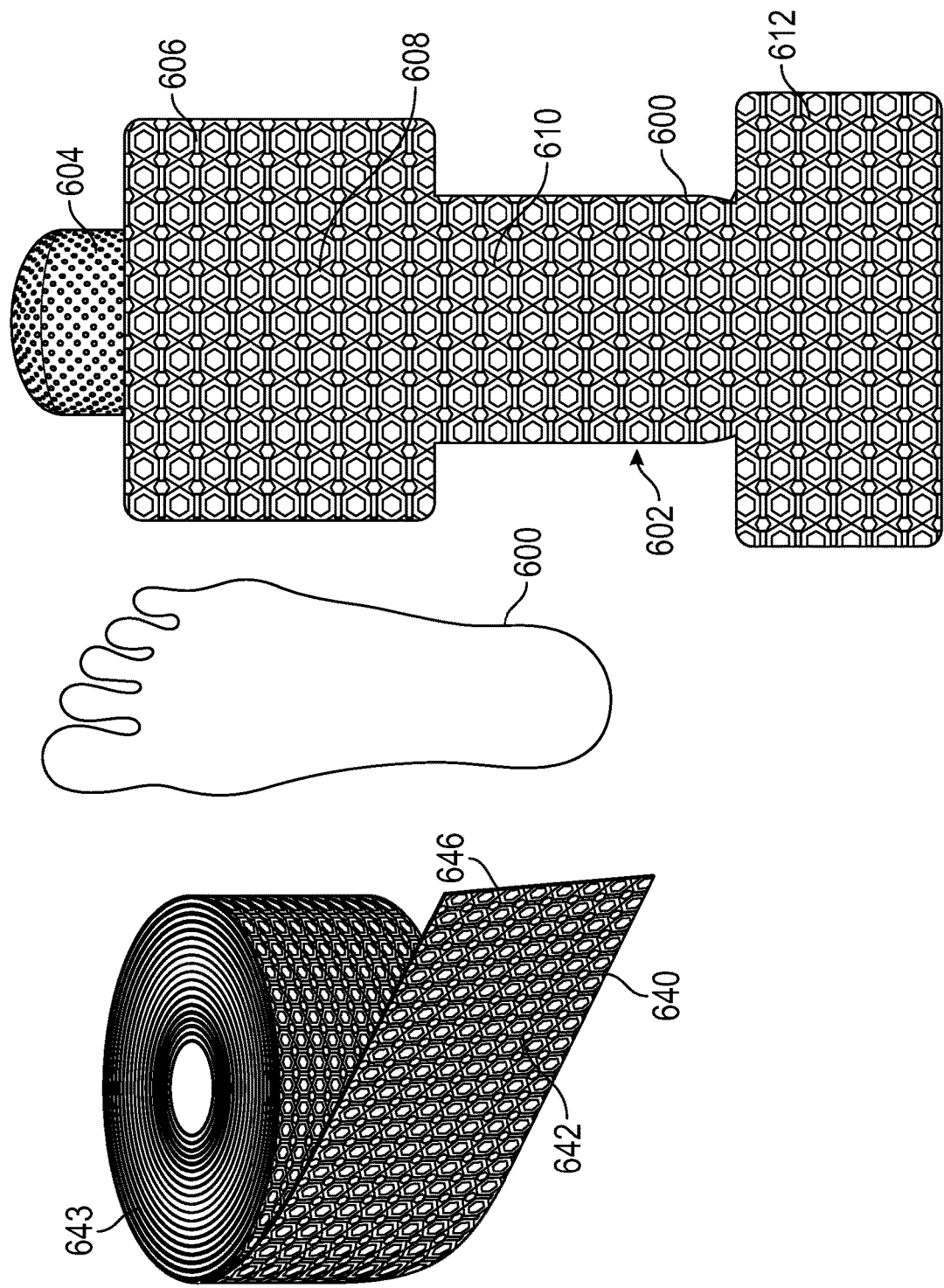
FIG. 6 is another embodiment of a foot cover in accordance with an illustrative embodiment.

FIG. 6 represents other embodiment of foot covers 602 and 640 in accordance with an illustrative embodiment. The foot covers 602, 640 may be placed on a foot 600 of the user. The foot 600 is also representative of a sock, shoe, slipper, cover, wrap, cast, or other footwear (whether soft or hard). The foot covers 602, 640 may be thick enough to provide some padding for the user's foot 600 when walking around. In addition, the thickness of portions of the foot cover 640 may vary or include additional padding in the way an insole is padded for a shoe to provide additional support and comfort as is known in the art.

In one embodiment, the foot cover 602 may be configured to wrap around the foot 600 of the user. The foot cover 602 is shown using rectangular shapes. In another embodiment, the foot cover 602 may be shaped to exactly or approximately fit the size and shape of the user's foot 600 when applied. In one example, the user may place his/her foot 600 on top of the foot cover 602 before wrapping the remaining portions up and around the foot 600 to be secured in place utilizing any number of fasteners (not shown).

The foot cover 602 may include a toe cover 604, instep wraps 606, a sole portion 608, heel 610, and ankle wrap 612. In one embodiment, the toe cover 604 is closed on a first end and open at a second end allowing the user's foot 600 to be slid into the foot cover 602. For example, the toe cover 604 may be cup shaped. In another embodiment, the toe cover 604 may be flat and may allow the edges of the toe cover 604 to be wrapped around the toes of the user from two or more sides. In another embodiment, the toe cover 604 may be rounded, oval shape, rectangular, or otherwise shaped like the toe of a sock.

A bottom portion of the toe cover 604 may extend to the instep wraps 606. The instep wraps 606 may represent a flange extending from a sole portion 608 of the foot wrap 602. The instep wraps 606 may cover all or portions of the ball and instep of the foot 600. The instep wraps 606 allows a front portion of the foot cover 602 to be secured over the foot 600 of the user together utilizing a fastener.

The heel 610 supports the heel of the user. A portion of the heel 610 may extend up the back of the foot 600 so that the ankle wrap 612 may be secured around the ankle or leg of the user to secure the foot cover 602 in place. In one embodiment, the heel 610 may also include a flange or wrap portion similar to the instep wraps 606. As a result, the foot cover 602 may be secured in multiple positions.

In one embodiment, the foot cover 640 is a lattice structure 642 that may be wrapped entirely or partially around the foot 600 of the user. The foot cover 640 may come in a roll 643 as shown. The width and length of the roll 643 may vary by industry, patient/user/wearer, application, and so forth. The width of the roll 643 may vary between 1-5 inches, but may be larger or smaller as needed. The foot covers 602 and 640 may be positioned and utilized regardless of whether the foot 600 is bear or covered by a sock, shoe, cast, bandages, or other covering. The lattice structure 642 provides for the free flow of air through the foot cover 640. In one embodiment, the foot cover 640 may include a front side 644 and a back side 646. The back side 646 may include an adhesive for securing the lattice structure 642 to the foot 600 of the user. The adhesive may be accessed utilizing a removable backing. For example, the adhesive may include a mild adhering agent (e.g., skin glue, etc.), a removable backing, fasteners (e.g., hook and latch, Velcro, etc.). In other embodiments the foot cover 640 may not include any adhesives.

The shape and pattern of the lattice structure 642 may vary based on utilization, wearer, required slip ratings, and any number of factors, parameters, information, and details as are herein specified. The foot cover 640 may be cut or shaped as desired for the foot 600 of the user.

Figure 7:
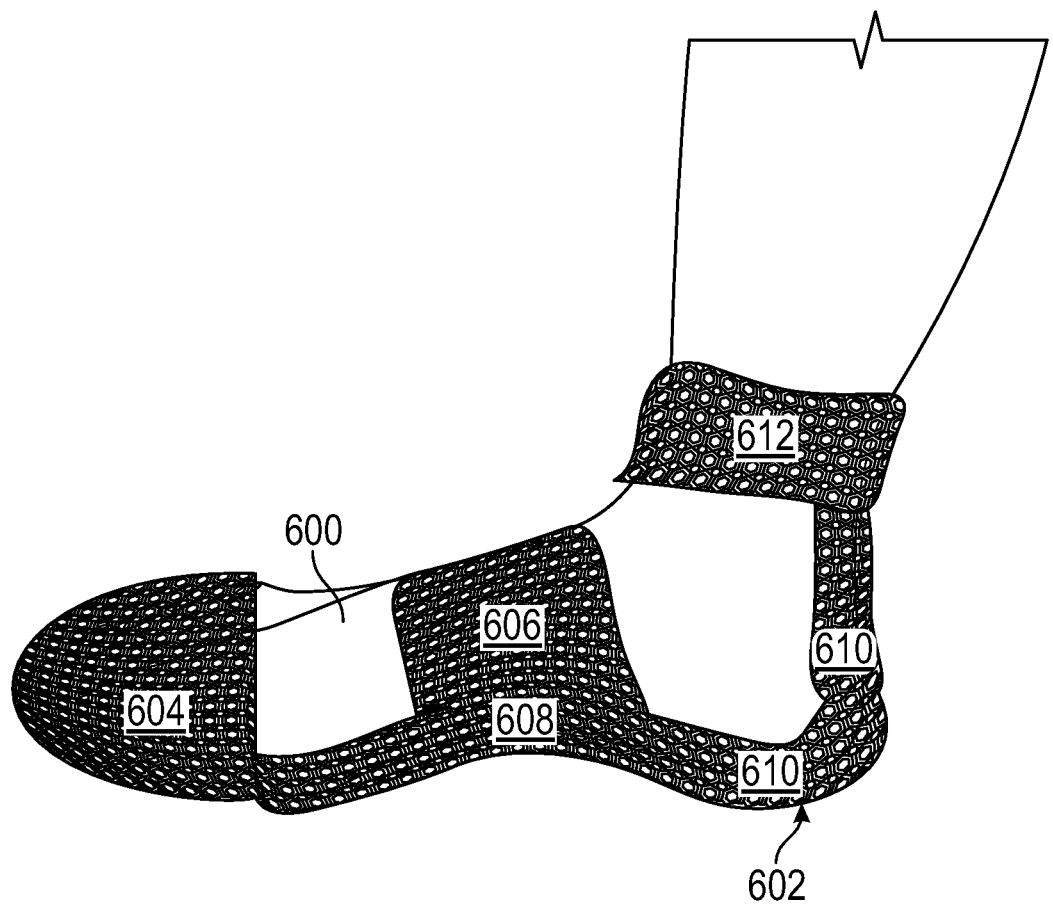
FIG. 7 is a pictorial representation of a foot cover positioned on the foot of the user in accordance with an illustrative embodiment.
Figure 8:
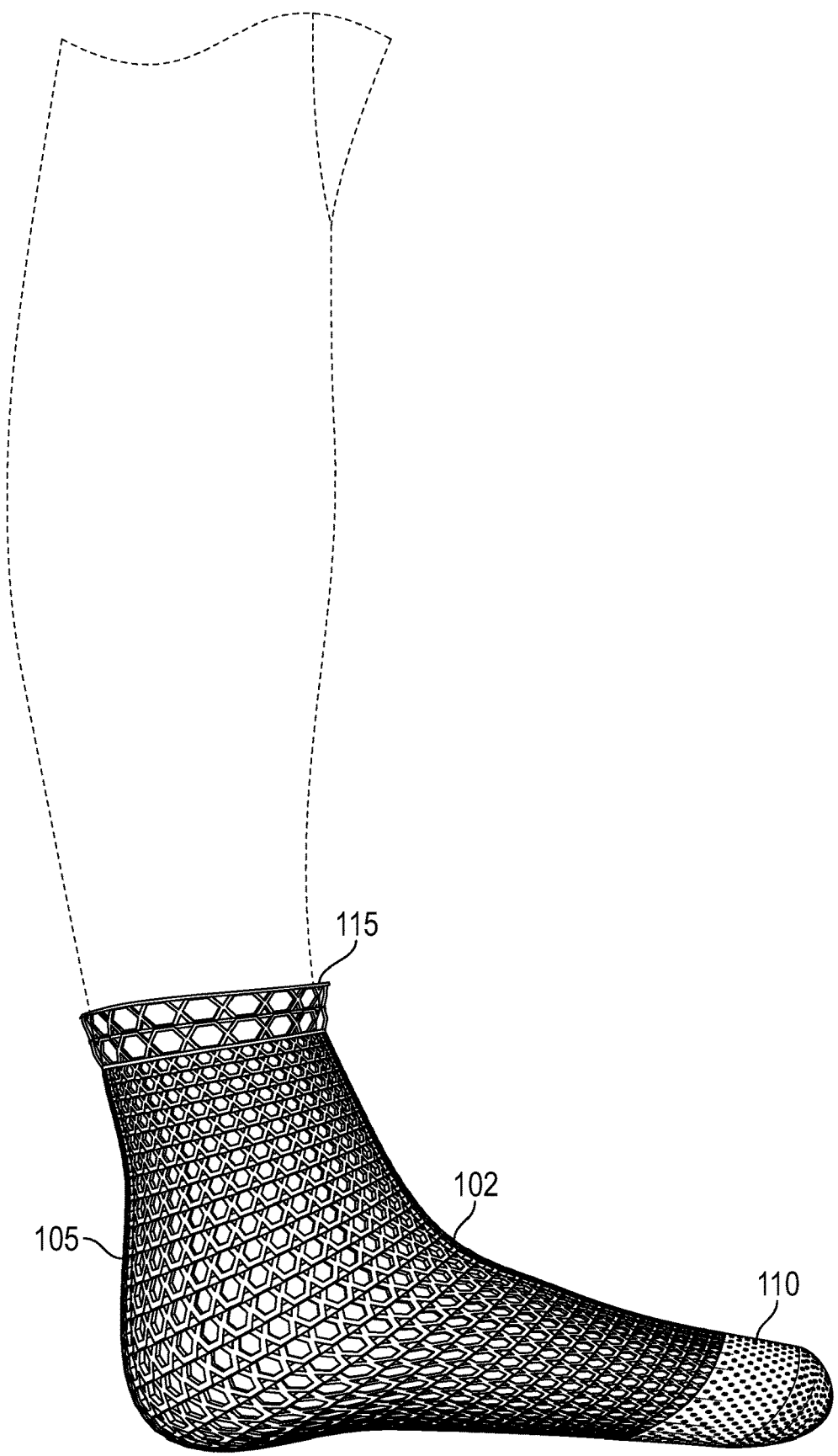
FIG. 8 is a pictorial representation of the foot cover of FIG. 1 being worn by a user in accordance with an illustrative embodiment.

FIG. 7 is a pictorial representation of a foot cover 602 positioned on the foot 600 of the user in accordance with an illustrative embodiment. The foot cover may also represent the foot cover 642 of FIG. 6. The foot cover 602 may provide slip protection for the foot 600 while still allowing the foot 600 of the user to breath. In one embodiment, the foot cover 602 may allow the feet of the foot 600 to be inserted in the toe cover 604 (or toe pocket). The instep wraps 606 and the ankle wraps 612 may allow the foot cover to be further secured to the foot 600 of the user. The instep wraps 606 may be fastened together. In one embodiment, fasteners, such as hooks or latches may be pre-attached or integrated in the lattice structure of the foot cover 602. The foot cover 602 may be flexible enough to be secured over a bare foot or over a booted foot that is casted because of a broken bone in the foot 600. The fasteners may be utilized without poking the foot 600 of the user.

In one embodiment, the foot covers may be shaped much like a lattice tube sock. In other embodiments, the foot covers may include a form fitting foot cover. For example, the foot cover may include a pocket heel and/or a toe pocket that are formed specifically for the heel and pocket (e.g., formed heel, formed pocket). The foot cover may include additional padding, cushioning, or thickness for the sole of the foot cover. The padding may be from the thickness from the lattice structure or may include additional layers or materials that may be sewed, adhered, compressed, melted, printed, or otherwise integrated with the sole of the foot cover. In other embodiments, a leg or crew may extend from the foot cover up the leg or calf of the foot cover to enhance circulation provide additional stability for the foot cover when worn or provide any number of other embodiments. In one embodiment, the foot cover may be 3D printed, extruded, weaved, or knitted over a foot model, form, tube, or blank to ensure the proper size and shape. The foot cover may include one or more indicators integrated with the lattice structure or printed on the exterior showing how the foot cover is to be positioned and worn. Separate instructions for use may also be included.

The illustrative embodiments may be utilized for any number of individuals in hospitals, nursing homes, detention centers, workplaces, homes or care facilities where there is a high risk of slipping or falling. For example, of the nation's nearly 1.5 million nursing home residents, most would qualify for being at high risk for falls by conventional standards. Many do fall, and as high as 5.4% have recently suffered an injury from their fall. Many of these environments have solid surface flooring which is even more susceptible to slippage, the foot covers would help optimize traction to reduce falls related to improper or no footwear.

More and more groups, individuals, organizations, facilities, and entities may begin to use the foot covers as they are benefit is proven and validated. For example, individuals, such as student athletes, dishwashers, maids, janitors, maintenance workers, and others may utilize the foot cover as part of their shower shoes, pool where, or work environment safety equipment. The foot covers may be distributed and sold through entities and organizations as needed or purchased by individuals. The illustrative embodiments may also be applied to attachable traction components for items or devices, such as canes, walkers, medical stools, crutches, chairs, temporary fixtures, and so forth. The covers may also be utilized as an anti-slip shower, kitchen, restaurant, or bathroom mats or rugs, pathways for slippery urban areas, and so forth.

In one embodiment, a breathable honey-comb foot cover may be utilized to cover bare feet, plaster casts, shoes, boots, surgical shoes, slippers, booties, or so forth to prevent slippage. In other embodiments, the foot cover may be modified to fit around athletic cleats, running shoes, cross-training shoes, boots, shoes or other footwear for rainy or snowy conditions.

The illustrative embodiments provide a substantial risk-aversion tool for hospitals, nursing homes, organizations, and individuals. As a result, the risks of falls, legal issues, and other costs and risks are reduced significantly. The simplicity of the wearing and using the foot covers provides good options for service providers and organizations. The illustrative embodiments may be conveniently and comfortably worn by patients, individuals, and users, regardless of footwear to reduce the potential for slipping across all demographics. The illustrative embodiments provide for substantial ventilation of the user's foot while worn increasing the likelihood that the foot cover will be worn comfortably more often and for greater amounts of time. The unique openings create a venting effect that may be utilized over socks or other footwear.

The illustrative embodiments are not to be limited to the particular embodiments and examples described herein. In particular, the illustrative embodiments contemplate numerous variations in the type of ways in which embodiments may be applied to various types of foot covers. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments disclosed with greater particularity.

What is claimed is:

1. A foot cover, comprising:
   a stretchable lattice configured to be worn over a foot of a user, wherein the stretchable lattice being fitted to a shape of a human foot, wherein the stretchable lattice forms the complete structure of the cover, and wherein the stretchable lattice defines a first plurality of openings and a second plurality of openings;
   a first end of the stretchable lattice enclosing toes of the foot of the user; and
   a second end of the stretchable lattice defining an opening for receiving the foot of the user, wherein the first end includes only the first plurality of openings that are smaller than the second plurality of openings associated with a body of the stretchable lattice.

2. The foot cover of claim 1, wherein the first plurality of opening and the second plurality of openings represent a honey comb pattern for visualizing the foot of the user and providing ventilation to the foot of the user.

3. The foot cover of claim 1, wherein the foot cover comes in a plurality of sizes to provided added traction to one or more users including the user.

4. The foot cover of claim 1, wherein the foot represents a bare foot, socks, slipper, or shoe of the user.

5. The foot cover of claim 1, wherein the stretchable lattice are defined by flattened strands for comfort while being worn and added traction.

6. The foot cover of claim 1, wherein the stretchable lattice delivers one or more medications to the user.

7. The foot cover of claim 1, wherein the stretchable lattice is inflatable.

8. The foot cover of claim 1, wherein the stretchable lattice is anti-microbial and antifungal.

9. The foot cover of claim 1, wherein the opening is flared from a body of the foot cover for better receiving the foot of the user.

10. The foot cover of claim 1, wherein the stretchable lattice is hollow for communicating fluids through the stretchable lattice to inflate or deflate the stretchable lattice or to heat or cool the stretchable lattice.

11. A foot cover, comprising:
a stretchable lattice configured to be worn over a foot of a user, wherein the stretchable lattice being fitted to a shape of a human foot, wherein the stretchable lattice forms the complete structure of the foot cover, and and wherein the stretchable lattice defines a first plurality of openings and a second plurality of openings;
a first end of the stretchable lattice enclosing toes of the foot of the user; and
a second open end of the stretchable lattice for receiving the foot of the user, wherein the first end defines only the first plurality of openings that are smaller than the second plurality of openings defined with a body of the stretchable lattice.

12. The foot cover of claim 11, wherein at least the second plurality of openings are honeycomb shaped.

13. The foot cover of claim 11, wherein the second open end is flared for receiving the foot of the user.

14. The foot cover of claim 11, wherein the stretchable lattice is coated in one or more medications.

15. The foot cover of claim 11, wherein at least a portion of the stretchable lattice is hollow for receiving gases or fluids for inflating or deflating the stretchable lattice or heating or cooling the stretchable lattice.

16. The foot cover of claim 11, wherein strands of the stretchable lattice are flattened for comfort while being worn and added traction.

17. A foot cover, comprising:
a stretchable lattice configured to be worn over a foot of a user, wherein the stretchable lattice being fitted to a shape of a human foot, wherein the stretchable lattice forms the complete structure of the foot cover, and wherein the stretchable lattice defines a plurality of openings enabling visualization and ventilation of the foot;
a first end of the stretchable lattice enclosing toes of the foot of the user; and
a second open end of the stretchable lattice for receiving the foot of the user, wherein the second open end is flared so as to gradually become wider at the second end.

18. The foot cover of claim 17, wherein the plurality of openings are honeycomb shaped.

19. The foot cover of claim 17, wherein the plurality of openings include a first plurality of openings associated only with the first end and a second plurality of openings associated with a body of the stretchable lattice, wherein the first plurality of openings are smaller than the second plurality of openings.

20. The foot cover of claim 17, wherein the foot represents a bare foot, a sock, or footwear of the user.

* * * * *